US010068426B1

(12) United States Patent
Pascal et al.

(10) Patent No.: US 10,068,426 B1
(45) Date of Patent: Sep. 4, 2018

(54) ONLINE GAME WITH ADJUSTED RESULTS

(71) Applicants: Andrew Pascal, Las Vegas, NV (US); Monty Kerr, Austin, TX (US)

(72) Inventors: Andrew Pascal, Las Vegas, NV (US); Monty Kerr, Austin, TX (US)

(73) Assignee: Playstudios, Inc., Las Vegas, NV (US)

( * ) Notice: Subject to any disclaimer, the term of this patent is extended or adjusted under 35 U.S.C. 154(b) by 212 days.

(21) Appl. No.: 14/318,655

(22) Filed: Jun. 29, 2014

Related U.S. Application Data

(60) Provisional application No. 61/840,632, filed on Jun. 28, 2013.

(51) Int. Cl.
*G06F 19/00* (2011.01)
*G07F 17/32* (2006.01)

(52) U.S. Cl.
CPC ................................ *G07F 17/3244* (2013.01)

(58) Field of Classification Search
None
See application file for complete search history.

(56) References Cited

U.S. PATENT DOCUMENTS

2003/0078101 A1 4/2003 Schneider
2004/0259631 A1* 12/2004 Katz .................. A63F 3/00157 463/25
2005/0130731 A1 6/2005 Englman
2005/0130737 A1 6/2005 Englman
2006/0084496 A1 4/2006 Jaffe
2008/0167117 A1 7/2008 Moshal
2008/0272541 A1 11/2008 Walker
2009/0170608 A1 7/2009 Herrmann
2009/0286585 A1* 11/2009 Walker ................ G07F 17/3244 463/17
2011/0086690 A1* 4/2011 Acres ...................... G07F 17/34 463/16
2012/0172108 A1* 7/2012 Acres .................... G07F 17/326 463/20
2012/0172130 A1* 7/2012 Acres .................. G07F 17/3223 463/42
2012/0295694 A1* 11/2012 Walker .................... G07F 17/32 463/25

OTHER PUBLICATIONS

Office Action in U.S. Appl. No. 13/922,248 dated Aug. 21, 2017.
Office Action in U.S. Appl. No. 13/922,248 dated Nov. 18, 2016.
Office Action in U.S. Appl. No. 13/922,248 dated Oct. 23, 2015.
Office Action in U.S. Appl. No. 13/922,248 dated Mar. 3, 2015.
P-Value, Wikipedia, published Jun. 5, 2012, https://web.archive.org/web/20120605153115/http:I/en .wikipedia.org/wiki/P-value.

* cited by examiner

*Primary Examiner* — Paul A D'Agostino
(74) *Attorney, Agent, or Firm* — Muskin and Farmer LLC

(57) ABSTRACT

A method, apparatus, and computer readable storage to implement a casual wagering game which is not for real money that can adjust its results based on past events. Based on detected patterns of past events, the mathematical model of a wagering game such as a slot game can change. For example, if a player has had a continuous streak of bad luck, the mathematical model of the game the player is playing can change so that the player would generally receive more favorable results.

15 Claims, 9 Drawing Sheets

ONLINE GAME WITH ADJUSTED RESULTS

This application claims benefit to U.S. provisional No. 61/840,632 which is incorporated by reference herein in its entirety.

BACKGROUND OF THE INVENTION

Field of the Invention

The present general inventive concept is directed to a method, apparatus, and computer readable storage medium directed to an online game which can selectively generate adjusted results based on certain conditions.

Description of the Related Art

Online games are known where players can play online wagering (or other) games for non-cash value credits. For example, slot machine games can be played in which the player places a non-cash value credit wager, spins reels, and potentially wins non-cash value credits depending on the result of the game.

SUMMARY OF THE INVENTION

It is an aspect of the present invention to provide a mechanism to adjust results of a game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
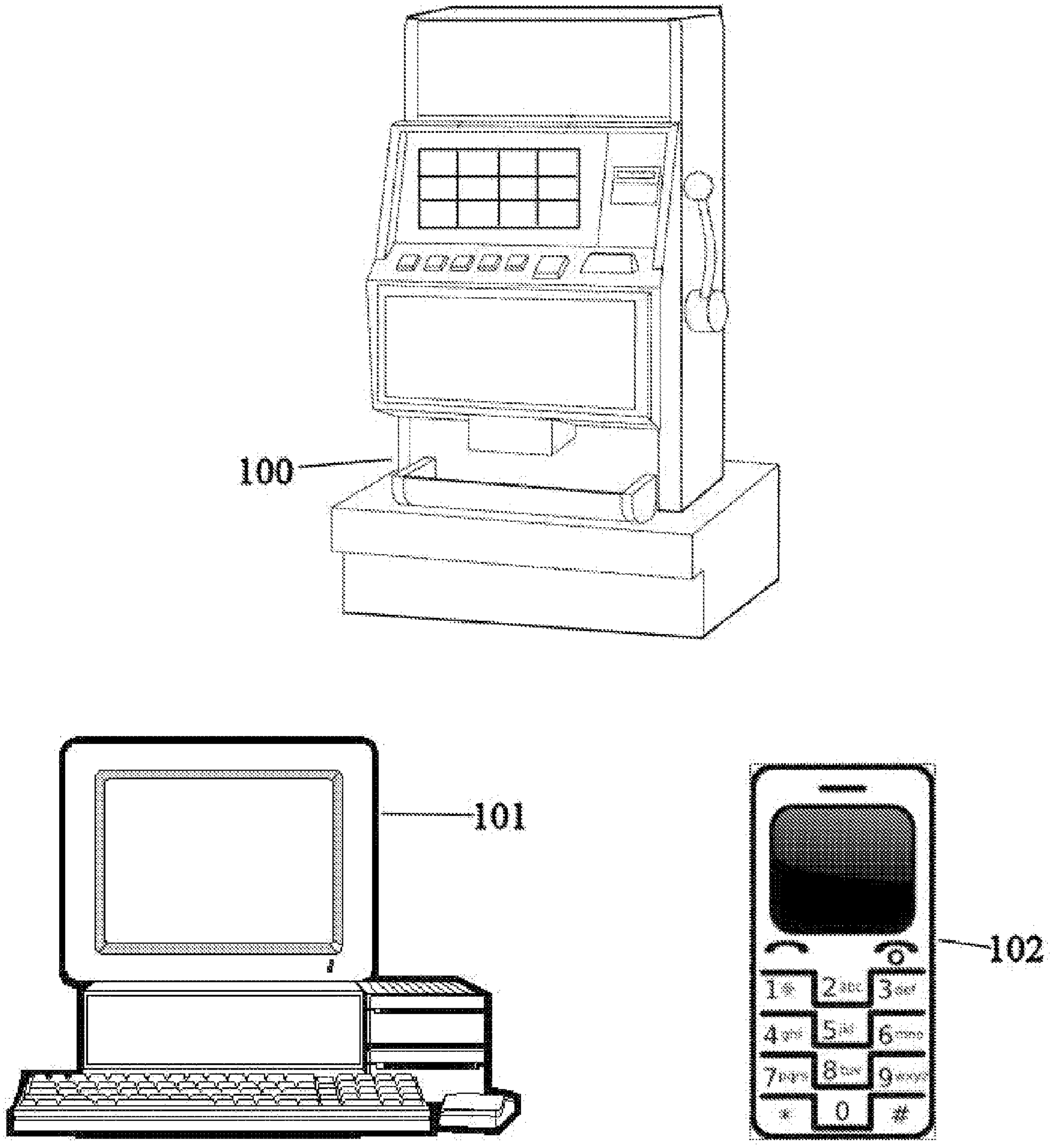
FIG. 1 is a drawing illustrating numerous apparatuses that can play the game described herein, according to an embodiment.

Reference will now be made in detail to the presently preferred embodiments of the invention, examples of which are illustrated in the accompanying drawings, wherein like reference numerals refer to like elements throughout.

The present inventive concept relates to a game that can be played on a social networking site such as FACEBOOK (including what is described in U.S. Pat. No. 7,669,123 which is incorporated by reference herein in its entirety), MYSPACE, or any other site which maintains a database of users and provides an interface for interaction.

FIG. 1 is a drawing illustrating numerous apparatuses that can play the slot machine game described herein, according to an embodiment.

The game described herein can be played on an electronic gaming machine 100 that can found in brick and mortar casinos or other venues such as internet cafes, etc. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the electronic gaming machine 100 from a central remote server.

The game described herein can also be played on a computer 101 such as a personal computer, laptop, etc. The game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social networking site itself "Casual play" is where the game can be played not for real money but for credits which typically have no cash value, but can have other benefits to the player.

The credits are used to place wagers and the games can be played until the player is out of credits. The player is free to purchase more credits using real money (cash) and pay using any electronic payment system (e.g., PAYPAL, electronic funds transfer, credit cards, etc.) In this way the company who operates the games can make a profit from all of the players who purchase credits using real money.

The game described herein can also be played on a cell phone 102 or any other type of portable device, such as a tablet computer, etc. The portable device can implement any of the paradigms described above with respect to the computer 101 (e.g., online casino, social networking site, etc.)

Figure 2:
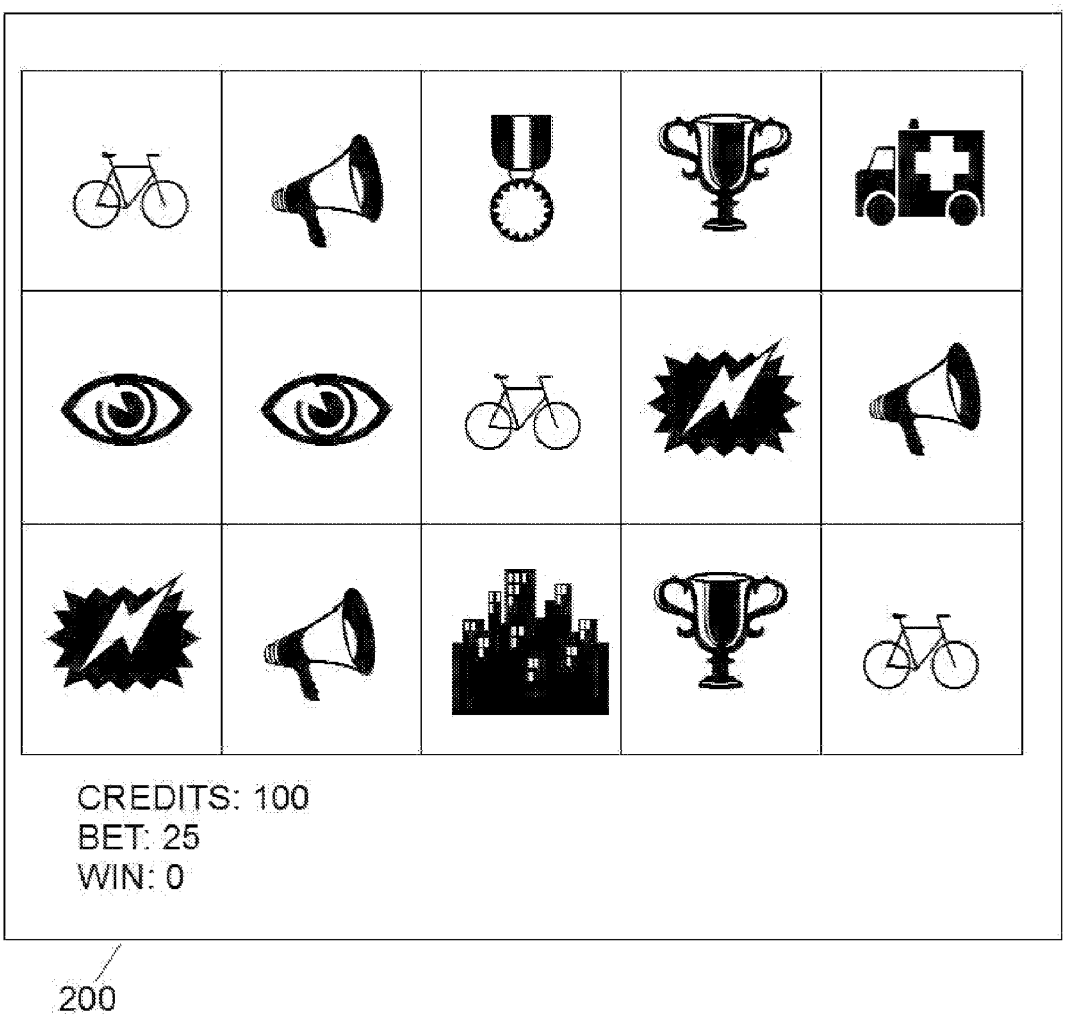
FIG. 2 is a drawing illustrating a play of a slot machine game, according to an embodiment.

FIG. 2 is a drawing illustrating play of a slot machine game, according to an embodiment.

A slot machine game such as that illustrated in FIG. 2 can be played. As known in the art, a player can place a wager (for real money or non-cash value credits) and initiate the spinning of the reels, watch the reels spin to a result, and get paid based on the result. There are a plurality of paylines on the final reel positions, and all of the symbols on each payline are compared to a predefined paytable to see if it is a winning combination. All winning combinations are paid for all active (played) paylines. For example, a player can play a slot game with 15 paylines and wager 2 credits on each payline for a total wager of 30 credits. If 14 paylines are losers (do not have a winning combination on the paytable) and 1 payline does have a winning combination (e.g., pays 10:1) then the player wins 20 credits (10 times 2), since the player wagered 2 credits on each payline. Thus, the player has a net loss of 10 credits for this spin. Thus, after the result has been determined and displayed, the player's original wager is resolved based on the result (also referred to as outcome) of the game. If the result is a loser, the player has lost his/her wager and receives no winnings. If the result is a payout, then while the player has already has his/her wager already deducted from his/her credit meter, the credit meter is also increased by the amount of credits (also referred to as chips) for the payout.

With regard to slot machines that accept and pay real money, the results must always be purely random. This is pursuant to gaming regulations which require results to be random and independent. Thus, the results cannot be "gaffed" in the result of a spin is not purely independent (the results of prior spin(s) cannot affect the current spin) and random. This is because if the player is playing real money, he is entitled to be presented with genuine results for that machine based on its mathematical model (which would typically have an overall percentage return to the player).

Slot machines that are played for non-cash value credits, points, or any quantity that is not cash and not directly redeemable for cash, may not be bound by the gaming regulations which require random results. Thus, the game has more liberty to generate adjusted results. An adjusted result is a result of a game which is not entirely random but is also dictated by conditions. Conditions can be based on prior playing events. For example, if a player has been on a losing streak, the player can be presented with "adjusted" wins so that the player does not get mad. Many such conditions (to be discussed in more detail below) can be configured in order to generate adjusted results when certain conditions are met (a trigger condition). An adjusted result can be a positive result for the player (e.g., a win) or a negative result for the player (e.g., a loss), a positive streak for the player, a negative streak for the player, particular results for the player, or any other set of results.

While the player plays, playing events can be recorded (stored electronically) so that it can be used to determine whether any trigger conditions have been met to trigger an adjusted result.

Figure 3:
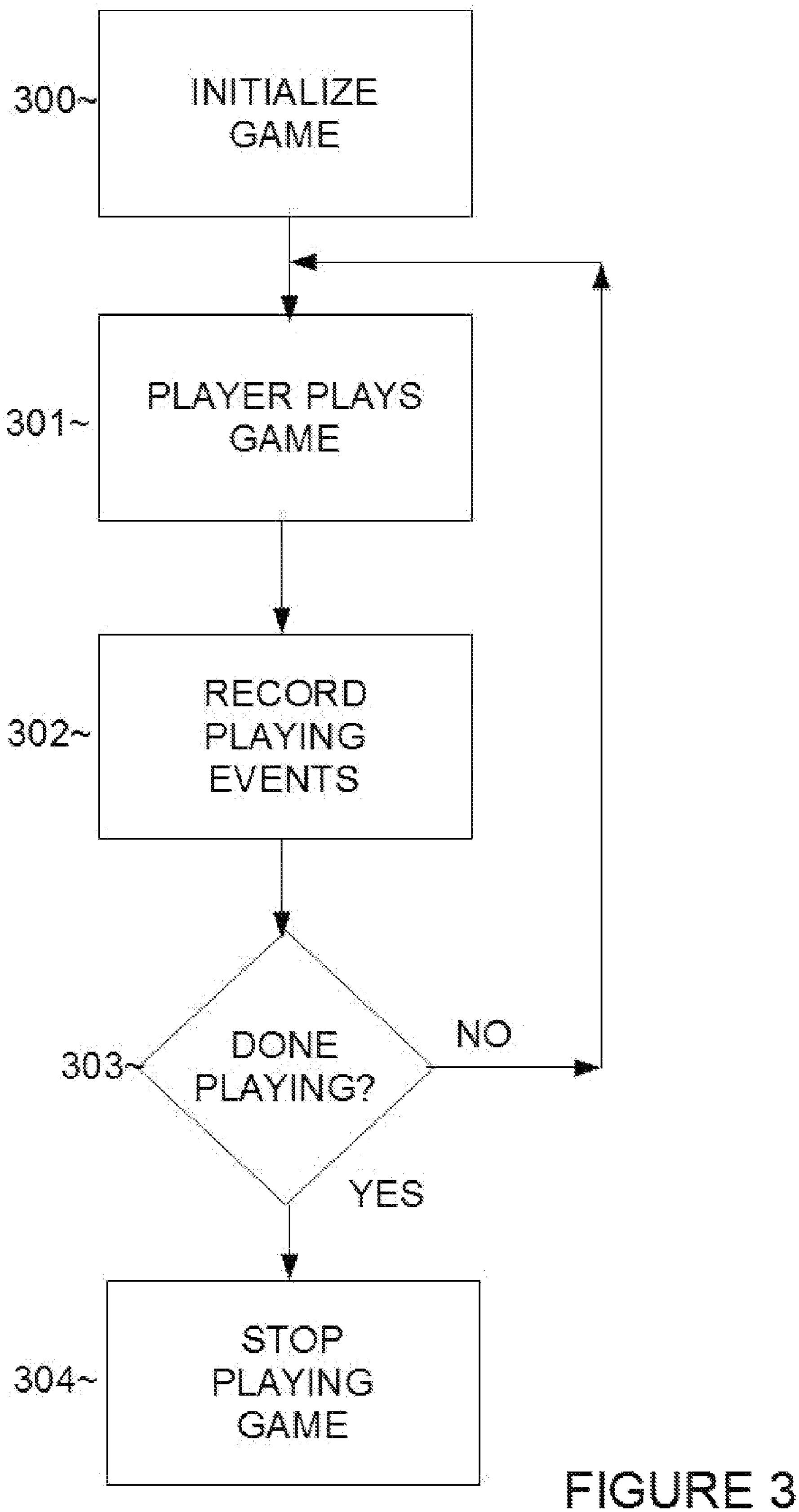
FIG. 3 is a flowchart illustrating the recording of playing events, according to an embodiment.

FIG. 3 is a flowchart illustrating the recording of playing events, according to an embodiment.

The method begins with operation 300, which initializes the game. This can comprise the player indicating his/her desire to play a particular game (using a graphical user interface (GUI)) and initiating the game which then loads in computer memory and executes.

From operation 300, the method proceeds to operation 301, wherein the player plays the game. This can be done as known in the art, wherein the player places a wager, spins the reels, views the game taking place, and the game automatically pays the player whatever amount the player may have won.

From operation 301, the method proceeds to operation 302, which records playing events. Playing events include each wager the player has made, the result, and any other data about the player's experience at the casino. Other playing events can be recorded too even though they may not be tied to an actual game. For example, whenever the player monetizes (purchases credits) this is recorded as a playing event. Players are free to purchase (using real money which is paid electronically) credits such as non-cash value credits/chips so that these credits can be used to play the games. Such events would be recorded even if they are not performed while the player is playing a game (e.g., instead of during FIG. 3, the recordation can be performed at any other time as well).

Recording events can comprise storing an electronic representation of an event that happened in a log associated with the player's account, so that all of the events that have happened during this player's use of the game system (including playing the game, making purchases inside and outside of the game, etc.) is recorded and can be used for any purpose later on.

The method continues to operation 303 which determines if the player is done playing. If the player continues to play the game, then the player is not done and the method returns to operation 301. If the player is done playing then the method proceeds to operation 304, wherein the player stops playing the game. The player is free to choose another game to play, purchase more credits (also referred to as chips), or any other action.

Once data is stored in the system it can be used to determine whether to initiate an adjusted results, and what that adjusted results would be. The majority of times, adjusted results would not be used. However, in a minority of situations, adjusted results would be used in order to "steer" the player's gameplay experience into a preferred gameplay experience. A preferred gameplay experience can be a number of things, for example the player gets more enjoyment from playing the game, the player monetizes (purchases anything using real money) as much as possible, etc.

Figure 4:
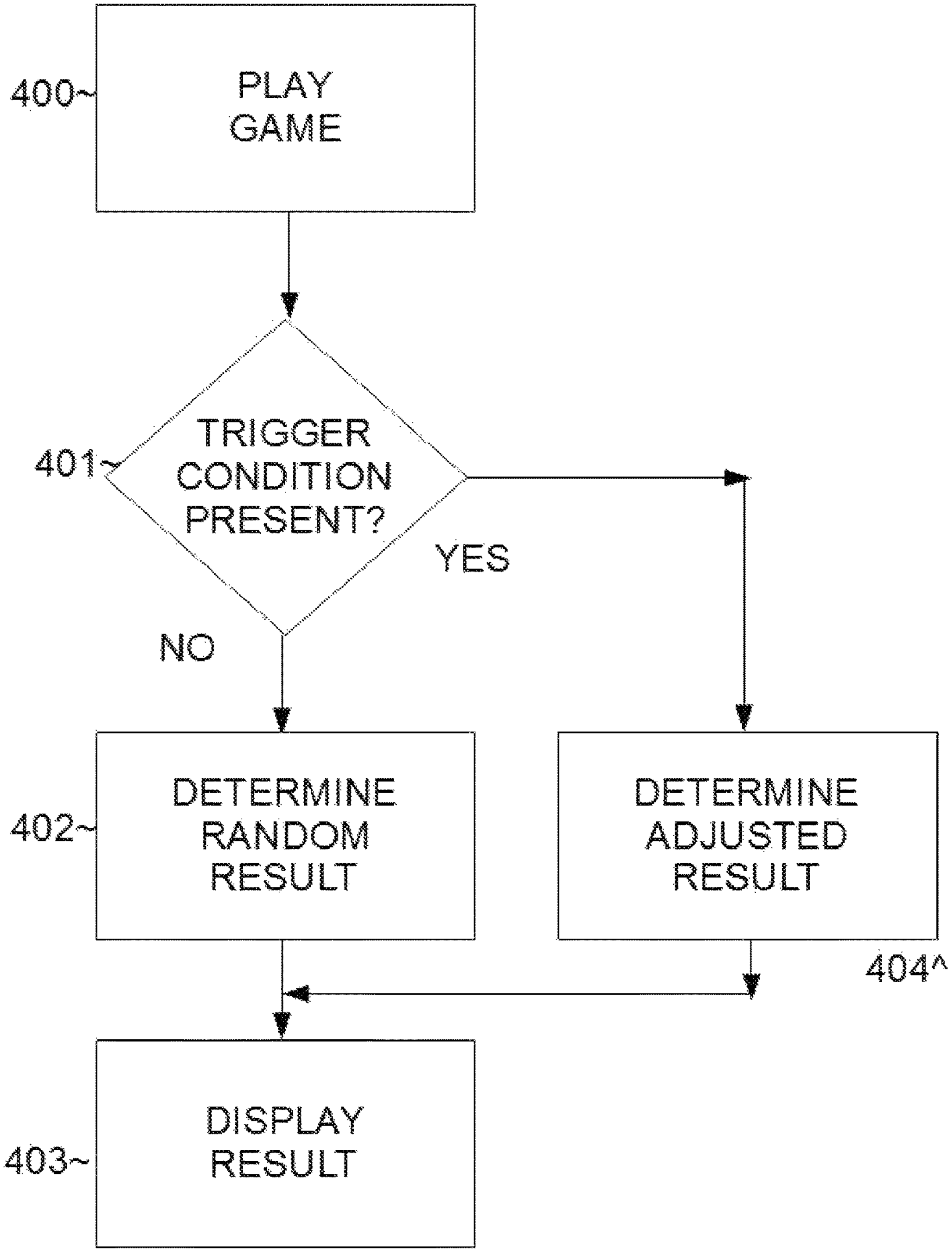
FIG. 4 is a flowchart illustrating an exemplary method of triggering adjusted results, according to an embodiment.

FIG. 4 is a flowchart illustrating an exemplary method of triggering adjusted results, according to an embodiment.

The method can begin with operation 400, in which the player plays the game. This can be done as described herein and known in the art.

From operation 400, the method proceeds to operation 401, which determines if a trigger condition is present. A trigger condition can be one (or more) of many conditions. As a number of examples: a) if the player has lost a predetermined number of games in a row (a loss is zero coin win or a net loss (negative win) for the game/spin); b) the player has lost a predetermined amount of credits (or coins) within a predetermined period of time; c) the player has monetized recently (within a predetermined period of time). Other examples of adjusted result conditions are: d) the player has won a predetermined number of games in a row; e) the player has won a predetermined amount of credits (or coins) within a predetermined period of time; f) the player has not monetized in a long time (predetermined period of time); g) the player is predicted to buy more credits in the near future; h) it is a particular period in time (e.g., 7 pm) and the player is known to monetize at 7 pm, and many others.

Of course many other trigger conditions can be used. Each trigger condition can be configured with its own set of parameters (e.g., how long a predetermined period of time is, or how much a predetermined amount of credits is) which can be any value (selected by the game operators). A trigger condition can also be determined previously and can remain active for a duration of time or spins (games played). This embodiment will be discussed below in more detail.

If in operation 401, the determination determines that there is no trigger condition present, then the method proceeds to operation 402, which determines the result of the game randomly (according to the game's standard mathematical model).

From operation 402, the method then proceeds to operation 403, which displays the result. If operation 403 is performed directly from operation 402 (i.e. operation 404 is not performed), then the result displayed is the random result determined in operation 402.

If in operation 401 it is determined that a trigger condition is present, then the method proceeds to operation 404, which determines an adjusted result. The determined adjusted result is based on the particular trigger condition that was present in operation 401. Different trigger conditions would have different adjusted results (or cause different adjusted results). For example, trigger conditions a, b, and c above could result in the adjusted results being better results for the player (e.g., wins). This is because if the player was on a losing streak, then the player should be entitled to win something so the player doesn't get too upset and leaves the game unhappy. Trigger conditions d, e, f, and g above could result in the adjusted results being worse results for the player (e.g., losses). For example, trigger condition g, ("the player is predicted to buy more credits in the near future.") could result in the getting adjusted results which are unfavorable to the player (e.g., cause the player to lose and "bust out" (lose all of their playable credits)). When a player busts out, the player may quit the game or purchase more credits with real money. If the player is predicted that the player would purchase more credits soon ("monetize") then the adjusted results could cause the player to bust out so that when the player has no more credits the player would purchase more credits. Of course the player is not required to purchase more credits and can stop playing the game (temporarily or permanently).

From operation 404, the method proceeds to operation 403, which displays the adjusted result.

In operation 403, regardless of whether it is coming from operation 402 or 403, when the result (random from operation 402 or adjusted from operation 404) is displayed, the reels on the slot game spin and stop at the determined position so that the player has no idea whether the result is random or adjusted.

FIG. 4 illustrates a method wherein decisions to adjust result are made on a spin by spin basis. In a further embodiment, a more natural gaming experience can be obtained by initiating an "adjusted program." When a trigger condition is present (to adjust the results) the trigger condition determines the adjusted program. An "adjusted program" is a series of consecutive adjusted results which will eventually lead the player to the intended result of the adjusted program over a series of spins. Each spin in the adjusted program may vary individually so that the player is not presented with a continuous series of winning or losing spins. For example, an adjusted program could be "bust out" which would eventually cause the player to lose all of his/her chips (also referred to as credits). The game can simply cause the player to lose each spin until the player busts out. However, this is an unnatural result (a continuous "losing streak) could cause players to become annoyed. Therefore, an adjusted program to bust out would cause the player to gradually lose all their credits/chips (e.g., over 20 spins) but would allow the player to win periodically as well so that the player is not presented with continuous losing spins. This gives the player "bad luck" but not such bad luck that the player continuously loses every spin (which would typically annoy players). Similarly, if the adjusted program is to cause the player to win 1,000 credits, the player can win the 1,000 credits over the next 10 spins even though some of those spins would be losing spins. This gives the player "good luck" but not such good luck that the player wins every spin.

An adjusted program can achieve its results in a number of different ways. For example, the adjusted program can alter the mathematical model of the game in order to improve (or reduce) the player's overall expected return of the game. Thus, if the adjusted program is "bust out", the game's mathematical model can change (such as the reel mappings and/or reel weights) so that the game plays normally (the winning payouts remain the same) but the frequency of winning payouts would be reduced (in theory) thus ultimately causing the player to "bust out" as long as the player continuously plays. Similarly, if the adjust program is to allow the player to win 10% of their bankroll, then a more player favorable math model can be used (e.g., different reel mappings and/or reel weights) so that the player would gradually win more (in theory) over the "regular" pay of the game. Typically, during an adjusted program the player would not know that they have received an altered (different) math model.

As an alternative to providing an alternative math model, the regular math model can be used but certain results would be "re-spun." For example, if the adjusted program is to "bust out", then the game results are determined normally but with certain results adjusted (e.g., certain symbol combination(s) would then be regenerated). For example, in this program, anytime the player gets five "heart" symbols (which would normally be a winning combination), a new random result is then determined and displayed. Note that slot game results are typically determined before the reels start spinning (or while they are spinning), so when results are changed, the player would typically not realize that the result was changed since the game result is still displayed normally.

Figure 5:
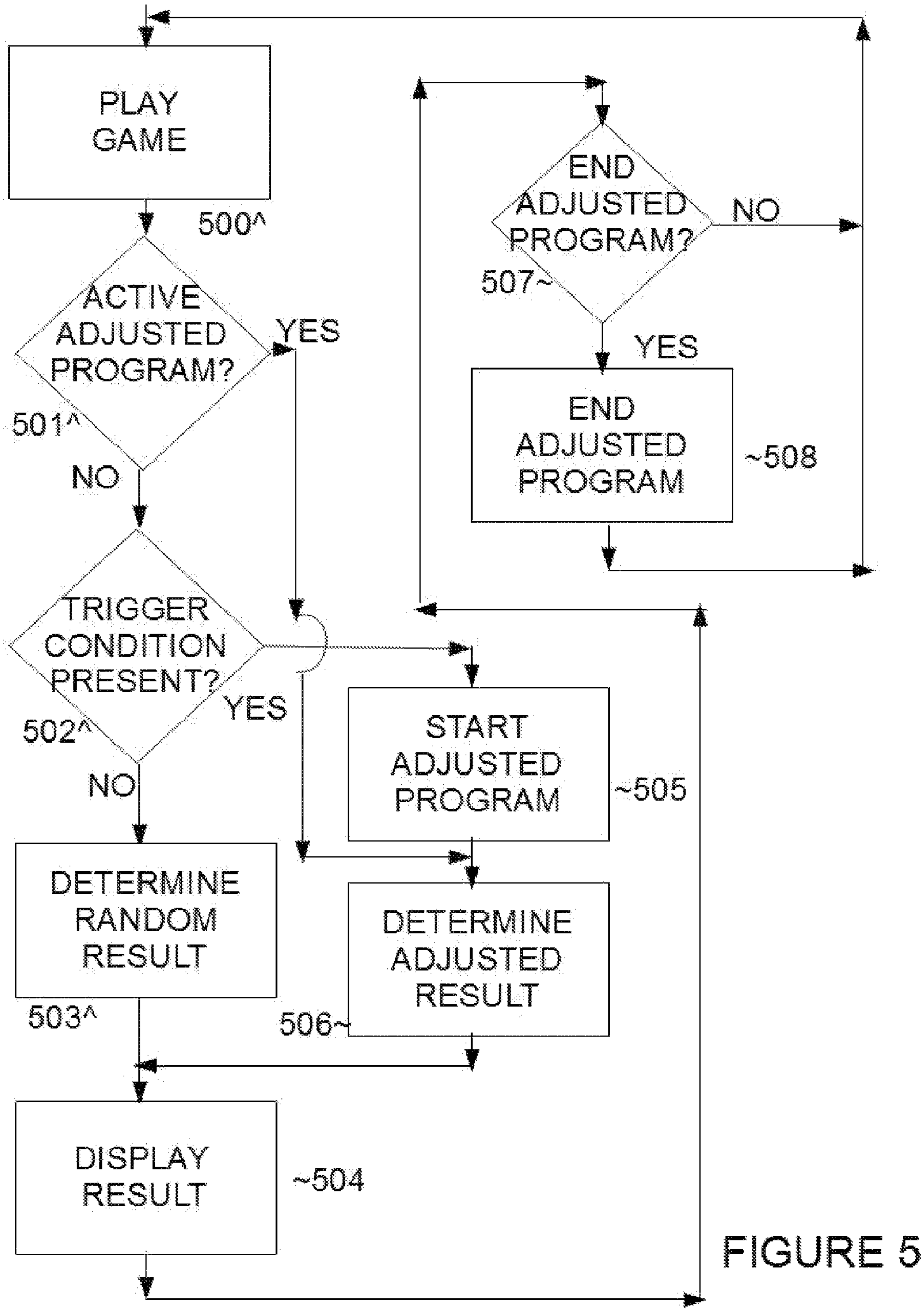
FIG. 5 is a flowchart illustrating an exemplary method of implementing an adjusted program, according to an embodiment.

FIG. 5 is a flowchart illustrating an exemplary method of implementing an adjusted program, according to an embodiment.

The method can begin with operation 500, wherein the player plays the game (e.g., a slot game or any other wagering game) using credits (or chips, coins, etc.)

The method then proceeds to operation 501, which determines whether there is a current active adjusted program. When a program is activated it typically does not last for just one spin (or play of the game) but a larger amount of spins. Thus, when a program is active, it would stay active until the program is terminated. The existence of whether a program is active can be tracked simply by using a flag or variable with a value (e.g., a value of 0 means no adjusted program, a value of 1 means a "bust out" program, a value of 2 means a "win 10%" program, etc.)

If there is no active program, then the method proceeds to operation 502 which determines whether a trigger condition is present. A trigger condition being present would initiate a program. If a trigger condition is present (the system can be configured with one or more such trigger conditions) then the method proceeds to operation 506.

If in operation 502, no trigger condition is present, then the method proceeds to operation 503, which determines a random result of the game using the game's standard math model. From operation 503, the method proceeds to operation 504 which displays the random result determined in operation 503.

If in operation 502, it is determined that a trigger condition is present, then the method proceeds to operation 505, which starts an adjusted program. There can be a number of different adjusted programs, and the particular adjusted program that is started can be determined based on the trigger condition present in operation 502. Table I illustrates an example of a set of trigger conditions and respective programs they would initiate. Depending on the trigger condition from operation 502, a respective adjusted program would be initiated (e.g., a flag can be set to designate the respective adjusted program triggered).

TABLE I

| Trigger condition | adjusted program |
|---|---|
| Player is predicted to be willing monetize | bust out |
| Player has had a losing streak (lost 7/10 last spins) | win 2,000 credits |
| Player has recently monetized and has had 7/10 losing streak | win 5,000 credits |
| Player predicted to update status to friends about large wins | win large payouts |

Of course, the examples in Table I are merely examples and other trigger conditions and respective adjusted programs can be used as well. For example, if the player is predicted to quit the game in the near future (e.g., in another few spins), then a program can be initiated to cause the player to win a large payout. As another example, if the player has over 100,000 coins then an adjusted program can be initiated to cause the player to lose 50,000 coins.

For example, a trigger condition can be whether the player is close to monetizing (which would trigger a "bust-out" adjusted program), and this can be determined in a number of ways. For example, if the player clicks an icon to purchase additional chips, which brings up a purchase window asking the player to confirm a purchase but then the player goes back without purchasing, this would indicate the player is close to monetizing. This can be a trigger condition which causes the bust-out adjusted program to initiate (or this in conjunction with some other factors such as a low chip count). As another way to predict that the player is close to monetizing, in the players record of playing events (operation 302) it can be determined a time of day in which the player frequently monetizes. For example, a player frequently monetizes in between 8 pm and 9 pm when the player is playing. Thus, at 8 pm (or some time in between 8 pm and 9 pm which can be chosen at random), a trigger condition can be initiated that compares the current time with a time from 8 pm to 9 pm, and the adjusted program that is associated with this trigger condition would be bust-out. Thus, come 8 pm (or 8:30 pm, 9:00 pm, or a random time in this range), the trigger condition would then be satisfied and the bust-out program would be initiated. In another embodiment, by reviewing the player's record of playing events, it can be determined that on average, a player monetizes every five playing sessions (a session can be each time a player signs into the game and plays). Thus, a trigger condition can be whether the current session is a fifth playing session for this player after the last time the player monetized. If so, then the bust out program can be initiated, because the player would be likely to monetize during this session.

Note any trigger condition described herein can be part of a set of trigger conditions. A set of trigger conditions comprises one or more trigger conditions in which all trigger conditions in the set must be satisfied in order to initiate an associated adjusted program, otherwise the associated adjusted program would not be initiated based on this set of trigger conditions (although it could be initiated from other causes such as a different set of trigger conditions). Any trigger condition described herein can be part of a set of trigger conditions which is combined with any other trigger conditions, which include whether a random event has occurred with any probability (e.g., a one in X chance has occurred where X can be any number from 2 to 1000 or more). In this way, just satisfying a particular condition is not enough (e.g., it is a certain time of day) but the random even also has to occur for the associated adjusted program to be initiated. Otherwise, every time the player plays at the predicted time the player will monetize will initiate a respective adjusted program, which may cause the player to be annoyed. Thus, the frequency of initiating adjusted programs can be reduced by incorporated a random event as another trigger condition in a set of trigger conditions. Each set of trigger conditions has one associated adjusted program (see FIG. 5) or mechanism for an adjusted result (see FIG. 4) which would be invoked by the trigger condition set only when the trigger condition set is met (i.e. all trigger conditions in the set are satisfied).

In a further embodiment, in some situations (e.g., a trigger condition set is satisfied), it would cause the player to win (instead of lose), thereby extending the players gameplay. This can be done for a number of reasons, for example, in some situations the game system would not want players to lose to quickly or cut short their play at certain times, as the player may grow frustrated and have a negative experience with the game (which may cause him to quit playing altogether). Thus, for example, if by reviewing the player's record of playing events (playing/event history), the player typically plays for 15 minute sessions and then purchases more chips, if a player is playing for less than this time (e.g., 7 minutes) and is almost out of chips, it may be profitable to extend the player's gameplay. This could allow the player more chips and let the player play for the 15 minute session the player is accustomed to, upon which the player may then hopefully monetize (purchase more chips ("purchase" as used herein refers to purchasing using real money/cash) or other goods/services from the game). Then an adjusted result in this situation would be to allow the player to win more credits/chips. An adjusted program in this situation would be to allow the player to continuously win over time (although the player would not win every hand in a row) in order to extend the player's gameplay. An adjusted program can be "extend gameplay X minutes" where X can be any number (e.g., 1 to 60 or more).

Gameplay can be extended by using a mathematical model that is more favorable to the player, which would cause the player to win more. This method may not be foolproof as the player could still experience bad luck, lose all his/her chips which would end the playing session unless the player purchased more chips at that time. Another way gameplay can be extended is comparing the player's current amount of chips to a predetermined number (e.g., 100, or a low number) and if the chips falls below that number then the player would receive an artificial result (which would be a winning outcome/result) so that the player would win and keep winning when their chip total falls below a certain amount so that the player would not "bust out" and have the playing session ended. This can continue until the number of minutes (e.g., X) has elapsed which the extend gameplay program is active. As an alternative to an amount of time to extend gameplay, a number of spins can be used (e.g., extend gameplay for 75 more spins). In this way, gameplay can be extended so that the player's playing session lasts a desired amount (e.g., a predicted length which would result in the player monetizing).

Thus, in some circumstances, it would be advantage to give a player good luck, bad luck, force them to win, lose, bust out, extend gameplay, etc. The player's event history (which comprises all events taken place, including game results, all purchases (monetization) by the player, etc.) is automatically reviewed by the system so that patterns can be determined. Patterns can include an average amount of something before an event happens, for example, player plays an average session of 12 minutes before monetizing (thus the system could extend the game play to 12 minutes or after 12 minutes bust out the player); player plays an average of 75 spins before monetizing (thus the system could extend the game play to 75 spins or after 75 spins bust out the player); player monetizes once on an average of 7 days after busting out (thus the system could cause the player to bust out after 7 days from the last monetization); player monetizes after playing for an average of 15 minutes (after signing into the game/initiating gameplay) and busts out (thus the system could cause the player to bust out after playing 15 minutes from sign-in), etc. Any event described herein can be tracked and analyzed over time to determine patterns of the particular player. Of course what might be a pattern for one player would be different for a different player and thus patterns are tracked and applied on a player by player basis. Once a pattern is determined for a particular player, than a trigger condition (or a set of trigger conditions) can be determined and checked for during the player's play (e.g., after every spin/game or any other periodic time). These are also referred to as dynamic trigger conditions because they can change over time based on the player's history. Each trigger condition (or set of trigger conditions) would have associated with it a single adjusted result (FIG. 4) or adjusted program (FIG. 5) which is activated (begins) upon satisfaction of the trigger condition or set of trigger conditions. Upon the occurrence of the trigger condition (or trigger condition set), then a respective adjusted result or adjusted program is initiated in order to steer the gameplay into a direction (which generally would be selected to encourage the player to monetize).

From operation 505, the method proceeds to operation 506, which determines an adjusted result based on the current adjusted program. Each adjusted program can have its own math model or other algorithm to vary the results of the standard math model of the game being played. From operation 506, the method proceeds to operation 504, which displays the adjusted result from operation 506 in the game. There would be no difference in the manner in which a random result (operation 503) and an adjusted result (506) would be displayed (e.g., the reels spin the same and stop on a combination in the same manner).

The result is displayed in operation 504, as described herein.

From operation 504, the method proceeds to operation 507, which determines whether to end the adjusted program. An adjusted program would end if the goal of the adjusted program has been met. For example, if the adjusted program is "bust out" and if the player currently has zero credits (or not enough credits to make a wager/bet) then the adjusted program would end since it is no longer needed. An adjusted program end condition(s) can be associated with each adjusted program, and when each respective adjusted program is active then that adjusted program would end when its respective end condition(s) are met, otherwise the adjusted program stays active.

If in operation 507, it is determined to end the current adjusted program, then the method proceeds to operation 508, which ends the current adjusted program (e.g., by setting the flag back to zero. From operation 508, the method returns to operation 500, where a new game can begin.

If in operation 507, it is determined not to end the adjusted program currently in place, then the method returns to operation 500 so that a new game can begin (and the adjusted program will continue as it will be identified in operation 501).

The methods illustrated in FIG. 4 and FIG. 5 are similar but not exactly the same. In FIG. 4, after each play (e.g., spin) by the player it is determined whether a trigger condition is present. Thus, a trigger condition can be present (which causes an adjusted result), then absent (which causes a random result), then present (which causes an adjusted result), etc. Thus, random and adjusted results may be intermingled. In FIG. 5, adjusted results are triggered by the presence of an adjusted program. An adjusted program typically would last for a number (e.g., 10-100 or more) of spins after it was initiated (although it is not required to). Thus, typically via the method illustrated in FIG. 5, there would be periods of continuous adjusted results and continuous random results. Thus, the method illustrated in FIG. 5 could result in less "choppy" game play. For example, if the adjusted program is "bust out" (cause the player to lose all his/her money), this program could be active while the player plays which causes adjusted results which generally are player unfavorable (e.g., over the long run will cause the player to lose, even though they can still win individual spins). The player typically would not know an adjusted program is active and the adjusted program can subtly work its effect until the goal is reached (in which the adjusted program can end in operation 507).

In an embodiment, the trigger conditions can be predetermined and static. In another embodiment, some (or all) trigger conditions can be dynamically selected. In other words, the trigger conditions can change depending on what happens in the game and the player's playing events. For example, a player can be predicted to monetize once a week. Thus, a trigger condition can be when that weekly cycle is over and the player is likely to monetize (which could cause an adjusted result or adjusted program of "bust out"). Once these "dynamic" trigger condition(s) are determined, they can be applied in operations 401 and 502. Before a dynamic trigger condition can be applied (tested for), it has to first be identified.

Figure 6:
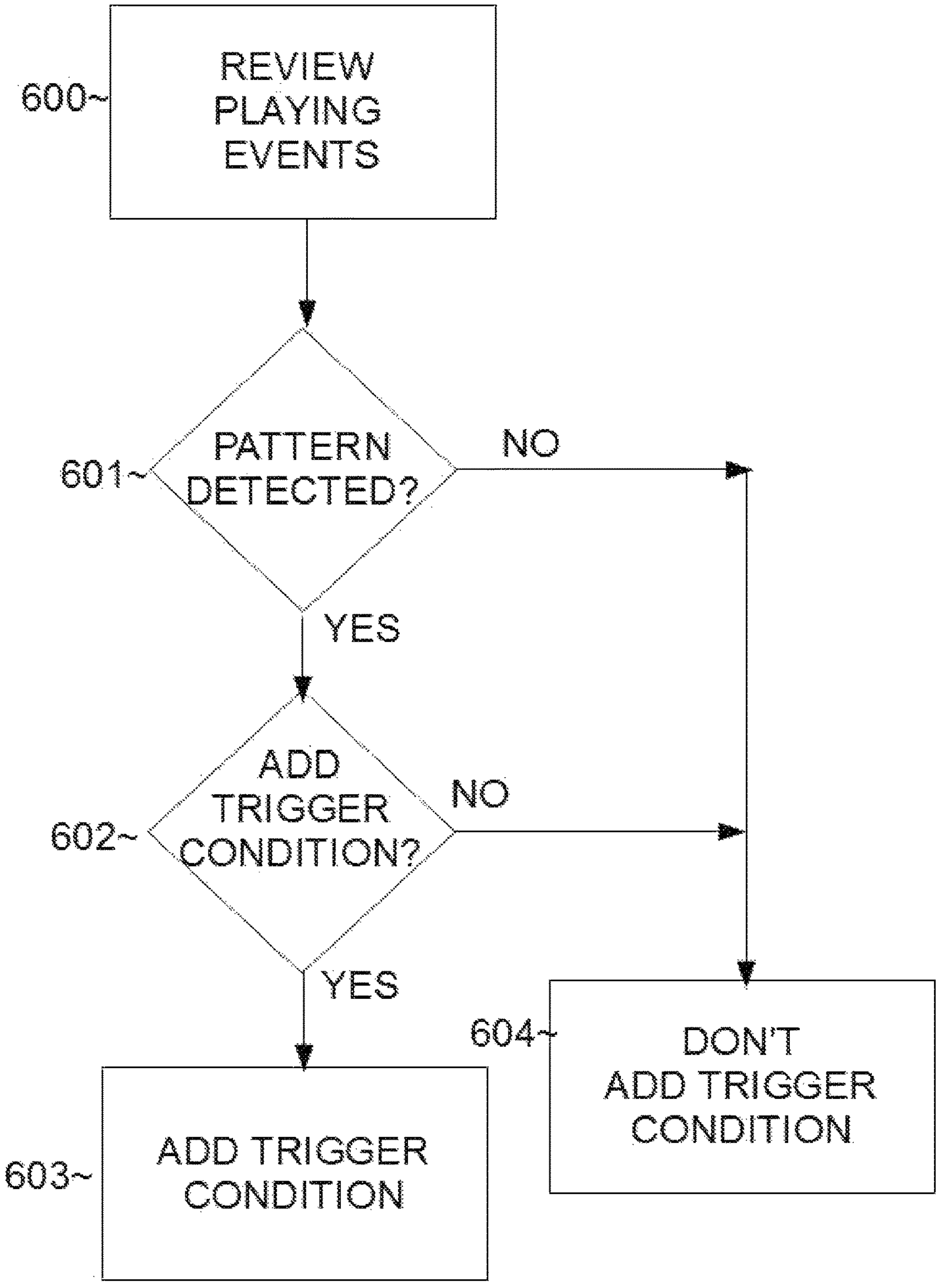
FIG. 6 is a flowchart illustrating an exemplary method of identifying patterns in order to add dynamic trigger conditions, according to an embodiment.

FIG. 6 is a flowchart illustrating an exemplary method of identifying patterns in order to add dynamic trigger conditions, according to an embodiment.

The method can begin with operation 600, which reviews playing events (which can be stored, for example, in operation 302). Playing events can be, times a player monetizes, big wins, large losses, times a player signs out of (quits playing for the day) the game, or any other characteristic.

From operation 600, the method proceeds to operation 601. Note that operations 600 and 601 can be performed separately or be intermingled with each other. Operation 601 determines whether there is the existence of a pattern. Patterns can be detected based on these events over time. For example, a player may be determined to monetize (purchase chips to play with) on the average every 7 days (does not have to be exact). Or a player can be determined to play for approximately a few hours each night at the same time and then quit. If no patterns are detected then the method proceeds to operation 604.

If in operation 601, it is determined that a pattern is detected, then the method proceeds to operation 602, which determines whether to add a trigger condition such that during continued play, if that trigger conditions exists then it would trigger a respective adjusted result 404 or adjusted program 505. Operation 602 can be optional, that is, in one embodiment, any pattern detected in operation 601 would add a trigger condition in operation 603. In another embodiment, operation 602 would selective add a trigger condition in operation 603 depending on other "pre-conditions." For example, if a pattern detects that a player is likely to monetize once per week, then a pre-condition can be that the average monetization is lower than a predetermined amount. For example, for players who monetize over $100 each week, then no "bust out" trigger condition would be added because the player already buys in for a lot of money. On the other hand, if the player monetizes for less than equal to $100 each week, then a trigger condition can be added to identify when the weekly time arrives that the player will monetize and initiate the bust-out program. As another example, a player who has been detected to typically for three hours (a three hour session) and then quit, identifying the end of the three hour session can be a trigger condition which would initiate a "good luck" adjusted program (so that the player continues to play instead of quitting). However, a pre-condition can be that the player must not have had a recent streak of good luck (otherwise more good luck would be unnecessary) before the trigger condition is added (that when the three hour period is about to end the good luck adjusted program will initiate).

Thus, in operation 601, one pattern that can be identified is when a player would be likely to monetize. Once this has been identified, it can then be added as a dynamic trigger condition. The determination of when a player is likely to monetize can be made based on a number of events. Events reviewed can comprise: recency of play; frequency of player; purchasing history of the player's friends; how much player is betting; whether the player clicks a "buy" button to buy chips which then brings up a purchase window but then decides not to complete the purchase and goes back without buying; prior purchasing behavior, etc.

For example, a trigger condition can be whether the player is close to monetizing (which would trigger a "bust-out" adjusted program), and this can be determined in a number of ways. For example, if the player clicks an icon to purchase additional chips, which brings up a purchase window asking the player to confirm a purchase but then the player goes back without purchasing, this would indicate the player is close to monetizing.

From operation 602, the method proceeds to operation 603, which adds the trigger condition (a dynamic trigger condition) so that operations 404 and 505 are now checking for the newly added dynamic trigger condition.

As discussed above, one trigger condition (or one condition as part of a set of conditions which comprise an overall trigger condition) is that the player clicked a button to purchase new chips (also referred to as credits) but then decided not to complete the purchase (a "near purchase"). It may be assumed that such a person was contemplating purchasing new chips but decided against it. This could be indicative of a player that might be close to monetizing. A trigger condition can be the combination of a near purchase plus the player currently as a small number of chips (e.g., less than 1000). If these two conditions are met, then the trigger condition is satisfied and an adjusted program (such as a "bust out" program) can be initiated. A third condition can also be added to the set, that is that a random number has to occur (e.g., a random number from 1 to 100 (or any other number) has to be 1) in order for the adjusted program to begin. This would prevent the bust out program from being initiated every time the player performs a near purchase along with having a low amount of chips. For a trigger condition that requires a near purchase as a trigger condition, in an embodiment there can be a recency requirement as well (and if the recency requirement is not met then the trigger condition would not be satisfied). For example, the near purchase must have occurred in the past 10 plays (or any other amount) of the game (or the past 30 (or any other amount) minutes). Alternatively, the near purchase must have occurred during the current gaming session (if the player signs out and stops playing the game then the current gaming session has ended).

Figure 7:
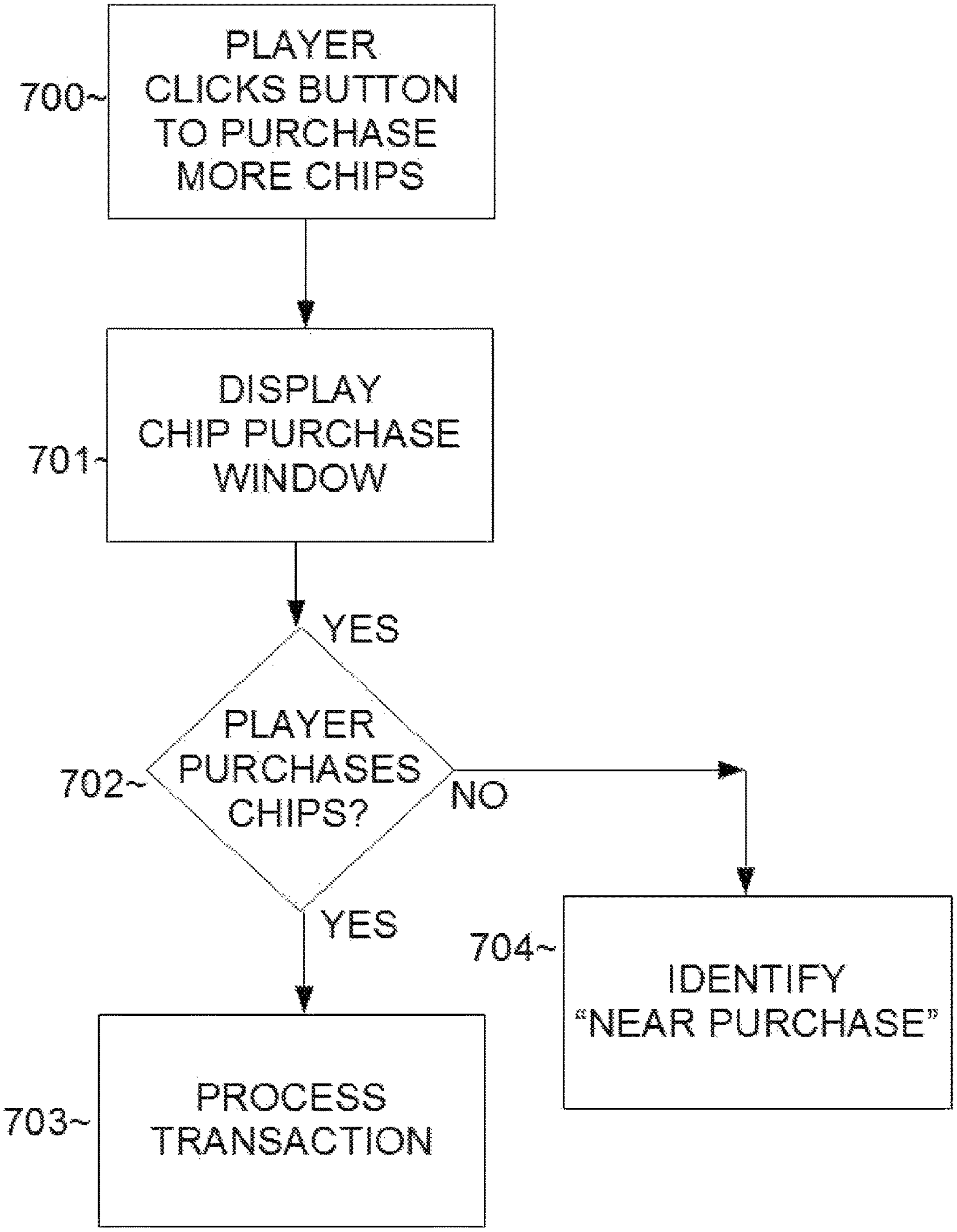
FIG. 7 is a flowchart illustrating an exemplary method to identify a near purchase, according to an embodiment.

FIG. 7 is a flowchart illustrating an exemplary method to identify a near purchase, according to an embodiment.

The method can begin with operation 700, wherein the player clicks a button on his/her screen to purchase more chips (credits, etc.)

Figure 8:
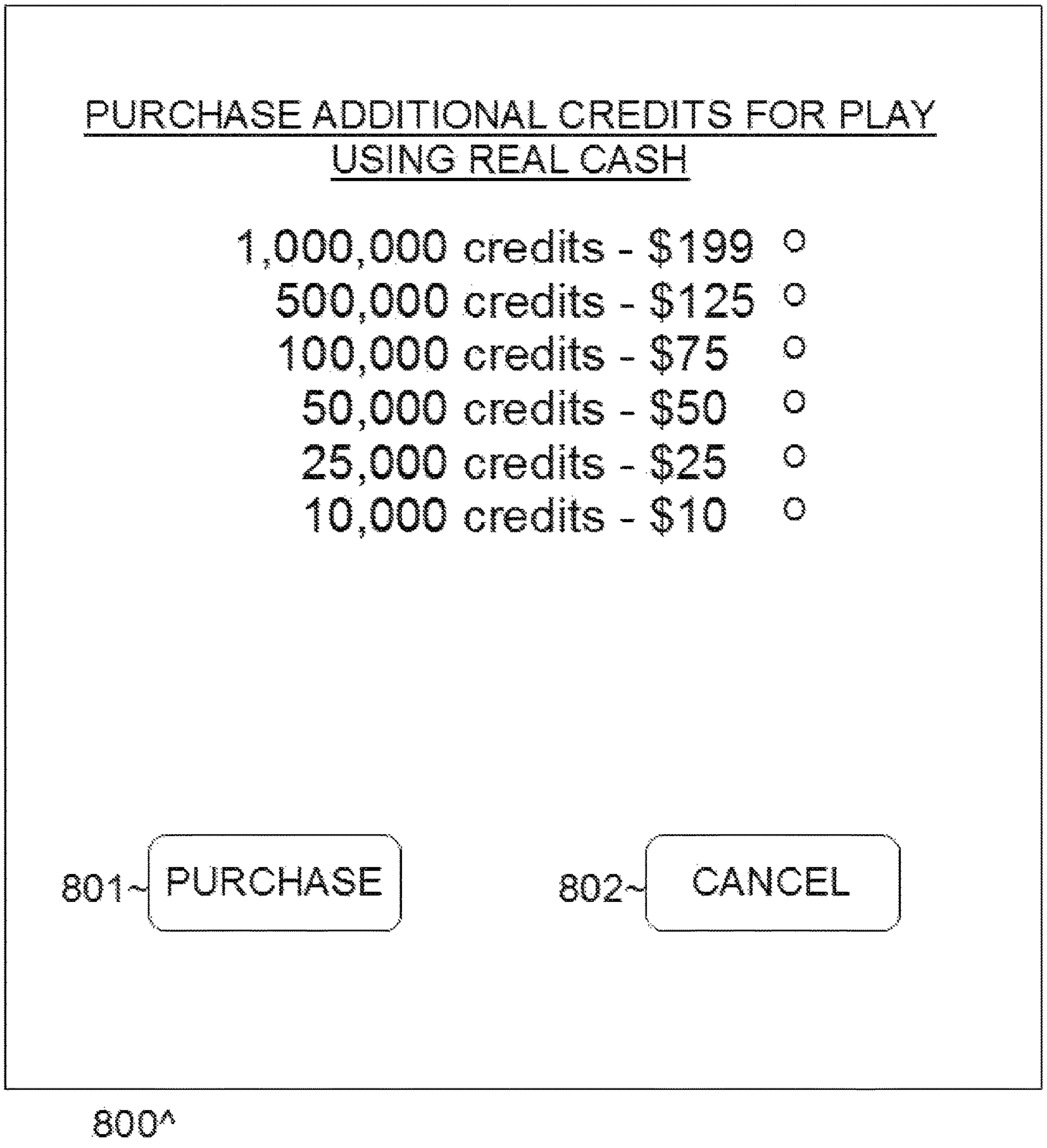
FIG. 8 is a drawing illustrating a chip purchase window, according to an embodiment.

From operation 700, the method proceeds to operation 701, which displays a chip purchase window (such as that illustrated in FIG. 8). The chip purchase window allows the player to purchase more chips (using cash) and provides the prices. The cash can be paid by the player using a number of different payment methods (e.g., PAYPAL, credit card, electronic funds transfer, etc.) Note that typically the chips are not exchangeable back into cash, therefore they technically have no cash value. Thus, the chips (used to play the games) can also be referred to as non-cash-value (NCV) chips.

From operation 701, the method proceeds to operation 702, which determines the player's course of action. The player can select which chip offer he/she wishes (e.g., pay $25 cash for 25,000 credits/chips by clicking an adjacent radio button. The player can then click a purchase button 801 in order to proceed to operation 703, which completes the transaction by causing the player to pay the cash amount and in return credits the player's account with the respective amount of chips/credits that the player can now use to play with.

If in operation 702, the player does not click the "purchase button" (e.g., presses a "back" button (not pictured) or presses a "cancel" button), then the method proceeds to operation 704 which identifies that the player has performed a "near purchase." This information can be used when checking for a trigger condition (e.g., one trigger condition set can be if the player performed a near purchase during the current gaming session and the player has less than 50,000 chips and a bust-out adjusted program has not been initiated in the past week. All of the three conditions in the set must be met for the trigger condition to be satisfied, otherwise it is not satisfied).

FIG. 8 is a drawing illustrating a chip purchase window, according to an embodiment.

A chip purchase window 800 can be brought up by the player using a graphical user interface (GUI) associated with the game. The chip purchase window 800 shows how much different amounts of chips (also referred to as credits) will cost the player. A purchase button 801 allows the player to purchase his/her selection (selected by radio buttons to the right of each option) and a cancel button 802 allows the player to not purchase anything and return back to the game the player was playing. The chip purchase window 800 can also be brought up automatically when the player is low on chips, out of chips, or does not have enough chips to make the currently selected wager.

The application (the game is a possible application) described herein can be hosted on one or more servers which are running in coordination with a separate set of servers hosting the social networking site.

Figure 9A:
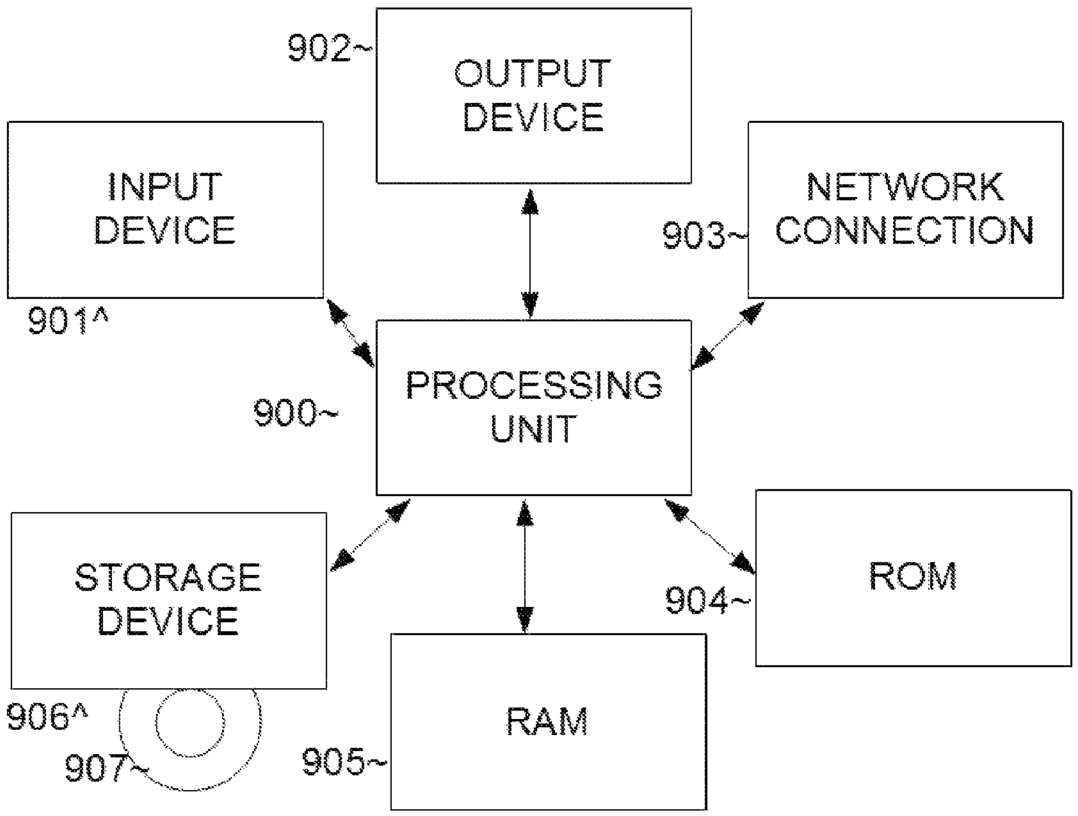
FIG. 9A is a block diagram illustrating exemplary hardware that can be used to implement the game described herein, according to an embodiment.

FIG. 9A is a block diagram illustrating exemplary hardware that can be used to implement the game (and any method/feature/embodiment) described herein, according to an embodiment. The hardware in FIG. 9A can be used to implement a computer implementing the game described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site. FIG. 9A can also illustrate a portable device running the game such as a cellphone, tablet computer, PDA, laptop, home computer, etc.

A processing unit 900 can be one or more microprocessors working together and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit is programmed (configured) to implement any method/feature/embodiment described herein. The processing unit 900 can also be connected to a network connection 903 which can connect to a computer communications network such as the Internet, Wi-Fi, LAN, WAN, etc. The processing unit 900 can also be connected to a ROM 904 and a RAM 905 as used in the art. The processing unit 900 can also be connected to a storage device 906 which can be nonvolatile and non-transitory storage device (e.g., BLU-RAY drive, CD-ROM drive, hard drive, EPROM, etc.) A computer readable medium 907 (e.g., BLU-RAY disc, CD-ROM, hard disc, etc.) can be read by the storage device 906 and can store programs and assets that can cause the processing unit 900 to perform any of the methods/features/embodiments described herein. The ROM and RAM can also be loaded with instructions that can cause the processing unit 900 to perform any of the methods/features/embodiments described herein.

Figure 9B:
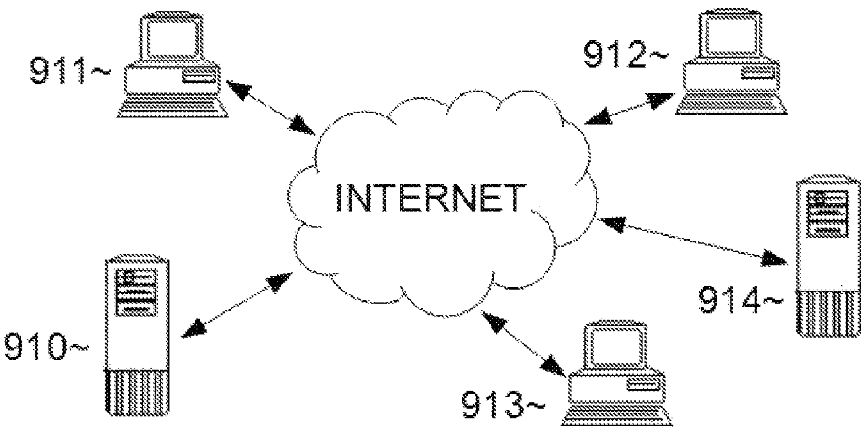
FIG. 9B is a network diagram showing a network structure for a social networking web site and players, according to an embodiment.

FIG. 9B is a network diagram showing a network structure for a social networking web site and players, according to an embodiment.

A computer communications network (such as the Internet) can be used to connect a host server 910 which can host and serve a social networking site. Note that while FIG. 9B shows only one server as the host server 910, the host server 910 can encompass numerous servers all cooperating with each other (whether in the same physical location or not). The host server 910 communicates with players 911, 912, 913 through the Internet (or other computer communication network) and can implement any of the methods/features/embodiments described herein by executing computer code programmed accordingly. Game server 914 can also implement all games and methods described herein on the site by executing computer code programmed accordingly. The game server 914 is connected to the Internet and can communicate with all of the players 911, 912, 913 directly or indirectly through the social networking site hosted by the host server 910. The game server 914 can cooperate with the host server 910 so that the games run on the game server 914 can be integrated into the social networking site hosted by the host server 910. The game server can also be optional and all of the games can be also hosted on the host server 910, whereby the integration of the games served/hosted by the game server 914 will appear embedded in the social networking site hosted by the host server 910 such that players would typically not realize (or care) that multiple servers are cooperating in order to play games on the social networking site. All of the communications described herein can be effectuated using such a network configuration. Typically, the communications are effectuated on the social networking site itself, thus the players 911, 912, 913 should be logged into the social networking site in order to participate herein, although logging in is not required (e.g., communications can be transmitted using other methods, such as email, IRC chat, instant message, etc.) The host server 910 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein. Programs to perform all methods/embodiments/features described herein can also be stored on a non-transitory storage medium (e.g., hard disk, etc.), which can be executed on one or more processing units (e.g., microprocessors) to implement any of the methods/embodiments/features described herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s). All variables and values described herein can take on any numerical value, including zero or values greater than zero.

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a game the method comprising:

providing an electronic processing unit;

providing and executing instructions on the processing unit programmed to perform: receiving a wager of credits from a player on a game, the credits being non-cash value credits;

providing and executing instructions on the processing unit programmed to perform: determining whether a pattern of play is detected and when the pattern of play is detected then add a trigger condition to a trigger set of one or more trigger conditions;

providing and executing instructions on the processing unit programmed to perform: determining whether the trigger set of one or more trigger conditions is satisfied;

providing and executing instructions on the processing unit programmed to perform: determining a result using a first math model used to determine the result for the game unless all conditions in the trigger set are satisfied upon which the result is determined using an adjusted result, the adjusted result providing the player a reduced expected return than the first math model;

providing and executing instructions on the processing unit programmed to perform: displaying the result on the game; and providing and executing instructions on the processing unit programmed to perform: resolving the wager based on the result.

2. The method as recited in claim 1, wherein the trigger set comprises a condition that the player views a credit purchase window without performing a purchase.

3. The method as recited in claim 1, wherein the trigger set comprises a condition that the player is predicted to be close to purchasing more credits.

4. The method as recited in claim 1, wherein the trigger set comprises a condition that a current time falls in a range of times when the player has monetized in the past.

5. The method as recited in claim 3, wherein the trigger set comprises if a current number of elapsed playing sessions since a last playing session when the player has monetized matches an average number of playing sessions the player takes to monetize.

6. The method as recited in claim 1, wherein the adjusted resulted causes the player to bust out playing the game.

7. The method as recited in claim 1, wherein the game is a slot game.

8. The method as recited in claim 1, wherein when the trigger set is satisfied an adjusted program is initiated.

9. The method as recited in claim 8, wherein the adjusted program causes the player to bust out playing the game.

10. The method as recited in claim 1, wherein the trigger set comprises a condition of a random event happening.

11. The method as recited in claim 1, wherein the adjusted result uses an adjusted math model that is different from the first math model.

12. An apparatus to implement a game, apparatus comprising:

a network connection connected to the internet;

a server connected to the network connection and comprising an electronic processor or processors, the processor or processors configured to interface with at least one player on the internet and to cause with respect to the player operations to:

receive a wager of credits from the player on a game, the credits being non-cash value credits;

determine whether a pattern of play is detected and when the pattern of play is detected then add a trigger condition to a trigger set of one or more trigger conditions;

determine whether the trigger set of one or more trigger conditions is satisfied;

determine a result using a first math model to determine the result for the game unless all conditions in the trigger set are satisfied upon which the result is determined using an adjusted result the adjusted result providing the player a reduced expected return than the first math model;

display the result on the game; and resolve the wager based on the result.

13. The apparatus as recited in claim 12, wherein the processor or processors are further configured such that the trigger set comprises a condition that the player views a credit purchase window without performing a purchase.

14. The apparatus as recited in claim 12, wherein the processor or processors are further configured such that the trigger set comprises a condition that the player is predicted to be close to purchasing credits.

15. The apparatus as recited in claim 12, wherein the processor or processors are further configured such that the adjusted result causes the player to lose on the game.

* * * * *